United States Patent
Yamamoto et al.

[11] Patent Number: 5,876,567
[45] Date of Patent: Mar. 2, 1999

[54] SOLVENT RECYCLING SYSTEM

[76] Inventors: Soichiro Yamamoto, 2 Allen Manor, Unionville, Ontario, Canada, L6C 1BZ; Jean-Pierre Pepin, 39 rue Dunant, Victoriaville, Quebec, Canada, G6P 6T5

[21] Appl. No.: 430,410

[22] Filed: Apr. 28, 1995

[51] Int. Cl.[6] .................................................. B01D 3/42
[52] U.S. Cl. ......................... 202/160; 159/44; 202/170; 202/185.3; 202/206; 202/263; 203/2; 203/DIG. 18; 203/DIG. 22
[58] Field of Search ........................... 203/1, 2, DIG. 18, 203/DIG. 22; 364/501; 122/504, 164; 159/44, DIG. 23; 196/132, 141; 202/160, 206, 185.3–185.6, 170, 263, 262; 220/89.1

[56] References Cited

U.S. PATENT DOCUMENTS

| | | | |
|---|---|---|---|
| 4,101,340 | 7/1978 | Rand | 134/11 |
| 4,199,102 | 4/1980 | Paul | 165/28 |
| 4,357,212 | 11/1982 | Osterman et al. | 202/206 |
| 4,556,457 | 12/1985 | McCord | 202/206 |
| 4,581,133 | 4/1986 | Tomes | 210/90 |
| 4,600,474 | 7/1986 | Korenowski | 159/47.3 |
| 4,822,429 | 4/1989 | McCord | 134/12 |
| 4,911,189 | 3/1990 | Halbert | 134/57 R |
| 4,929,312 | 5/1990 | Westcott | 203/2 |
| 5,011,542 | 4/1991 | Weil | 134/38 |
| 5,015,337 | 5/1991 | Fraser | 202/169 |
| 5,062,372 | 11/1991 | Ritter | 110/242 |
| 5,075,982 | 12/1991 | Rodgers, Sr. et al. | 202/170 |
| 5,082,525 | 1/1992 | Travis | 202/160 |
| 5,106,425 | 4/1992 | Sluga et al. | 202/170 |
| 5,180,438 | 1/1993 | Hockh et al. | 134/21 |
| 5,248,393 | 9/1993 | Schumacher et al. | 202/170 |
| 5,288,333 | 2/1994 | Tanaka et al. | 134/31 |
| 5,298,082 | 3/1994 | Weitz | 134/40 |
| 5,304,253 | 4/1994 | Grant | 134/26 |
| 5,360,027 | 11/1994 | Harman | 134/102.3 |
| 5,431,179 | 7/1995 | Miyaza | 134/61 |
| 5,461,831 | 10/1995 | Michal | 52/1 |
| 5,472,575 | 12/1995 | Parkinson et al. | 202/206 |

OTHER PUBLICATIONS

Uni-ram Encore URS-800 Solvent Recycling System (1994).

*Primary Examiner*—Virginia Manoharan
*Attorney, Agent, or Firm*—Howard M. Ellis; Marianne Fuierer

[57] ABSTRACT

A distillation solvent recycling system is provided which is characterized by improved safety features, modular construction, a double insulated solvent reservoir, electronic control and display of system parameters, and self diagnosis of system malfunctions. The components of the system are assembled into a compact unitized structure so as to maximize safety, efficiency, portability, convenience and ease of operation and maintenance. An outer insulative and protective safety casing shields the operator from process hazards while the system is in operation. An inner lid is provided with improved sealing mechanisms for preventing the escape of toxic solvent vapors. An outer safety lid shields the operator from heat and trace vapors in the vicinity of the solvent reservoir.

32 Claims, 8 Drawing Sheets

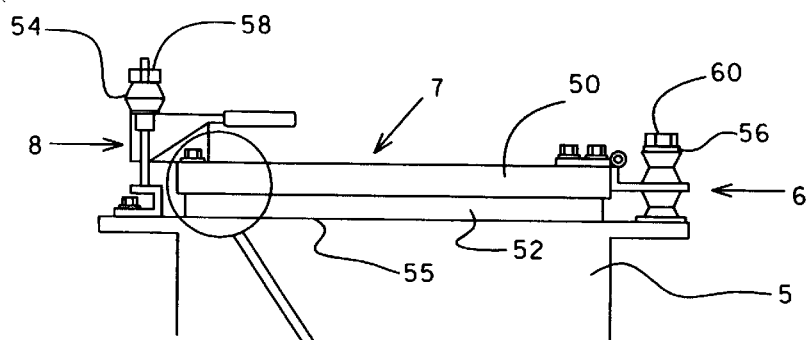
Fig. 3
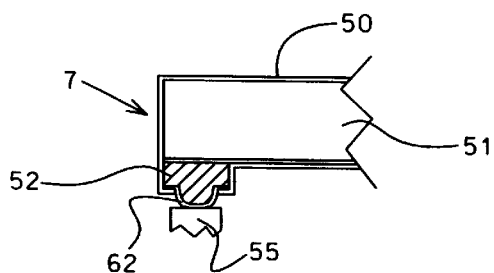
Fig. 3a
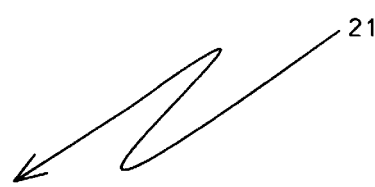
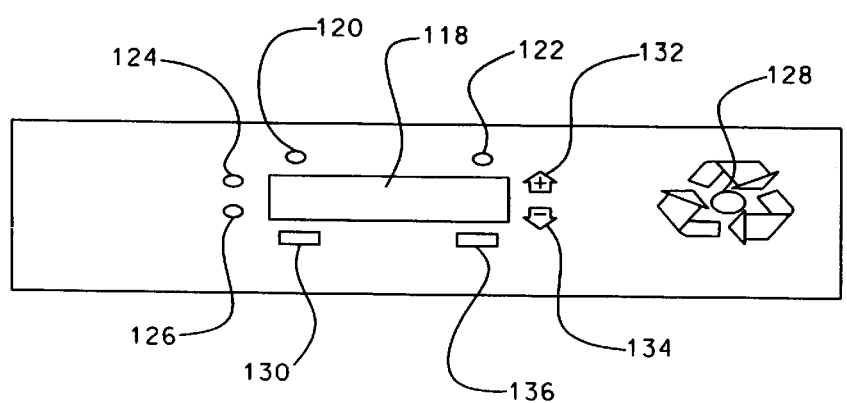
Fig. 4

SOLVENT RECYCLING SYSTEM

TECHNICAL FIELD

The present invention relates generally to systems and methods for purifying solvents, and more specifically, to compact integral devices having improved safety features for recycling organic solvents.

BACKGROUND OF THE INVENTION

The use of organic solvents, thinners and cleaners is important to many industrial and commercial processes. One example is the use of organic solvents to clean and degrease metal components such as engine and other motor vehicle parts. Another example is dry cleaning processes in which fabrics are cleaned by applying synthetic and petroleum solvents to remove greasy soils. In each of these processes, the components or fabrics to be cleaned are subjected to the action of one or more solvents to remove grease, oil, and the like. Since the grease and oil are dissolved into the solvent, the solvent that remains is contaminated. Many such solvents are classified as hazardous waste. Consequently they cannot be disposed of through conventional means. Commercial solvents themselves are relatively expensive. Added to this expense are increasingly strict management requirements and regulations.

The economics and benefits of in-house solvent recycling systems are becoming increasingly apparent. As a result, a variety of systems for on-site solvent purification and recovery have been developed.

While the systems of the prior art have been effective in recovering solvent, some problems associated with solvent recovery processes have yet to be overcome. These problems stem from the toxic nature of the solvents being processed and the high temperatures required to heat the contaminated solvents to their boiling points. In particular the surfaces surrounding the heating and boiling elements of such systems become extremely hot and pose dangers to an operator. Additionally, noxious fumes emitted during the process can escape into the atmosphere presenting further operator and environmental hazards. Of further concern to the operator is the amount of system information readily available to her during system operation and the ease with which the operator can determine the status of the system.

Representative U.S. Pat. No. 4,929,312 to Westcott discloses a solvent recovery apparatus and method comprising an evaporator unit having a heat source for vaporizing solvent from a contaminated body of such solvent. This earlier device lacks desired features for preventing organic solvent from escaping into the atmosphere.

Accordingly, there is a need for an improved, highly automated, plug-in ready to use system for purifying organic solvents for recycling and reuse while providing important operational safety features, and which is unitized into an integral, highly compact device especially useful for shops and plants having limited floor space.

SUMMARY OF THE INVENTION

Accordingly, it is a principle object of this invention to provide for an improved solvent recycling system, especially one in which the components of the system are assembled so as to maximize safety, efficiency, ease of operation and maintenance, portability and convenience. Generally, the device of the invention is characterized by functionally grouped components assembled into a compact unitized structure and surrounded by an outer insulative and protective safety casing. The components are easily removable for cleaning, servicing, or inspection. At the same time, the operator is shielded by the outer safety casing from process hazards such as hot solvent, solvent vapor, clean solvent liquid, hot components and the like.

Such a device comprises a contaminated solvent reservoir means having liquid solvent inlet means and solvent vapor outlet means, an inner closure means for the solvent reservoir means engaging with the liquid solvent inlet means, means for heating liquid solvent in the contaminated solvent reservoir means, means for receiving and condensing solvent vapor discharged through the solvent vapor outlet means, cooling means for the means for receiving and condensing solvent vapor, means for collecting purified solvent condensate from the means for receiving and condensing solvent vapor, and electronic means for controlling operation of the solvent recycling system. The contaminated solvent reservoir means, inner closure means, means for heating liquid solvent, means for receiving and condensing solvent vapor, cooling means for the means for receiving and condensing solvent vapor, means for collecting purified solvent condensate and electronic means for controlling operation of the solvent recycling system are combined into an integral unitized structure and provided with an outer insulative and protective safety casing.

It is a further object of the invention to provide for solvent recycling systems having advanced safety features comprising: contaminated solvent reservoir means having liquid solvent inlet means and solvent vapor outlet means; inner closure means for the solvent reservoir means engaging with the liquid solvent inlet means; outer closure means for the solvent reservoir means, the outer closure means having an open and closed position and being superimposed over the inner closure means to prevent noxious fumes in the region between the inner and outer closure means from escaping into the atmosphere; means for removing noxious fumes from the region of the inner and outer closure means; means for heating liquid solvent in the contaminated solvent reservoir means; means for receiving and condensing solvent vapor discharged through the solvent vapor outlet means; cooling means for the means for receiving and condensing solvent vapor; electronic means for controlling operation of the recycling system, and means for collecting purified solvent condensate from the means for receiving and condensing solvent vapor.

It is yet a further object of the invention to provide for automatic solvent recycling systems that minimize the need for operator intervention in the solvent recycling process. The solvent recycling system of the invention comprises electronic means for controlling system operation. Devices of the invention have at least one temperature sensor for sensing the temperature in the reservoir in which the contaminated solvent is boiled. The invention further provides means for generating a temperature control signal in response to the sensed temperature. When the sensed temperature meets or exceeds a pre-selected temperature set point, the application of heat to the solvent vapor reservoir is discontinued.

It is a further object of the invention to provide for a solvent recycling system having a centralized information panel allowing an operator to gather system status information and to control the recycling process while the operator is insulated from the process components. As a result, operator exposure to heat and toxic fumes is minimized. System status information includes information as to whether a recovery cycle is in progress, has been interrupted or is completed; information about system malfunctions;

temperature information; and information as to whether power is being supplied to critical components of the system. The information panel is provided on the outer insulative and protective safety casing and comprises a computer keypad for information entry and display means for displaying system information.

It is a further object of the invention to provide for a solvent recycling system having means for displaying system malfunction information.

It is yet a further object of the invention to provide for a solvent recycling system having improved means for responding to smoke and fire within the system thereby further reducing the hazards associated with the solvent recycling process. In one embodiment of the invention a smoke detector means is disposed within the outer insulative and protective safety casing for sensing fire within the safety casing and disconnecting power to the unit in the event of a fire.

It is a still further object of the invention to provide for a solvent recycling system for even further reducing the hazards associated with the solvent recycling process. One embodiment of the invention provides a solvent recycling system having a fire extinguisher means disposed within the outer insulative and protective safety casing for sensing the presence of fire and extinguishing the fire.

It is yet a further object of the invention to provide for a method of controlling the boiling phase of a solvent recycling system comprising the steps of: sensing the temperature in the contaminated solvent boiling reservoir; comparing the rate of rise of the sensed temperature with a predetermined rate of rise limit; discontinuing the application of heat to the boiling reservoir when the rate of rise of the sensed temperature exceeds the predetermined rate of rise limit.

BRIEF DESCRIPTION OF THE DRAWINGS

For a further understanding of the invention, as well as its characterizing features reference should now be made to the accompanying drawings wherein:

FIG. 3 is a detailed view of the inner lid employed in sealing the solvent reservoir.

FIG. 3a is an enlarged view of the seal means of the inner lid of FIG. 3.

FIG. 4 is a detailed view of the electronic display panel.

DESCRIPTION OF THE PREFERRED EMBODIMENTS

Figure 1:
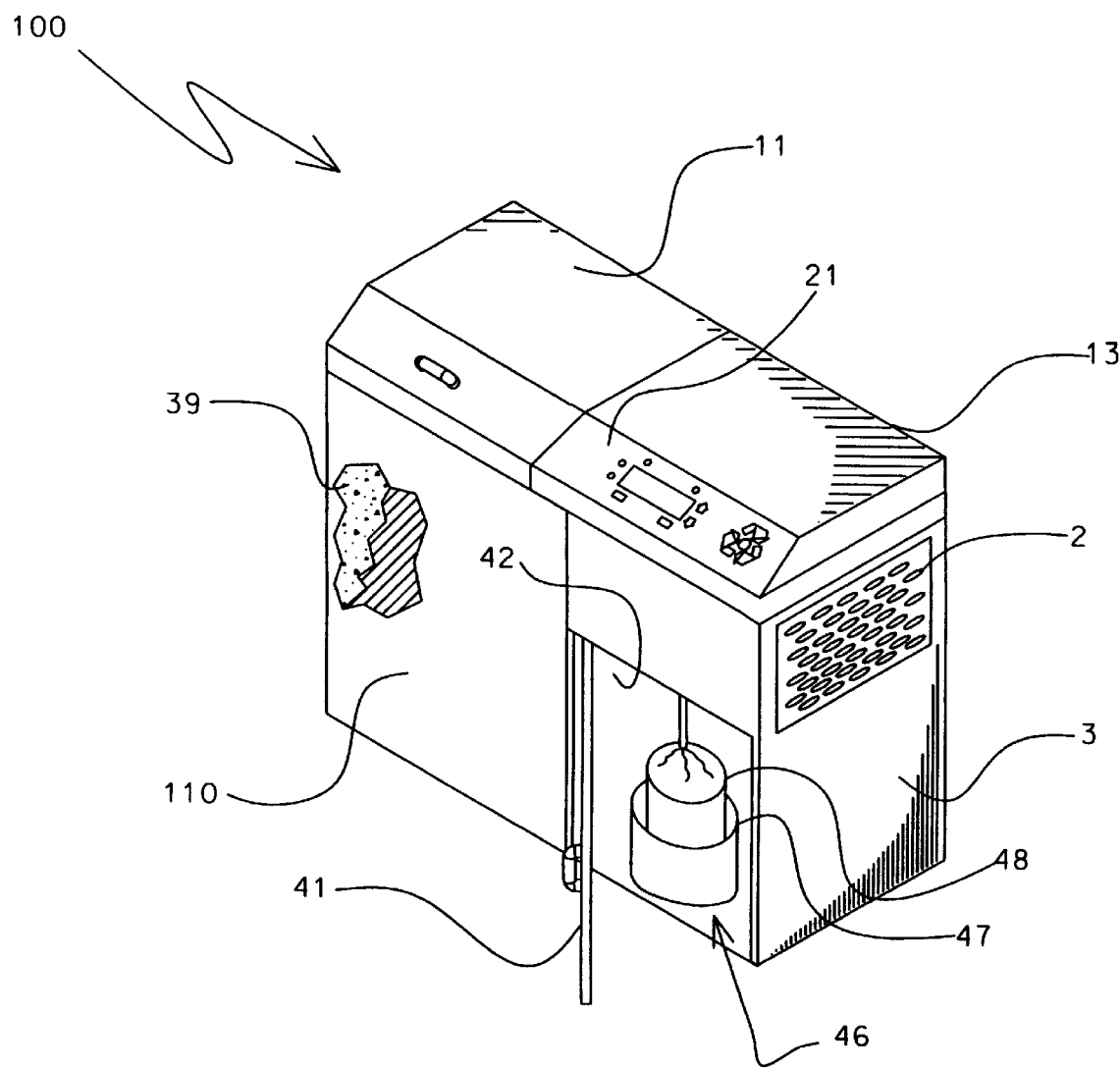
FIG. 1 is a perspective view of the solvent recycling system.

Turning to FIG. 1 there is shown a view of solvent recycling system 100. Solvent recycling system 100 includes an outer insulative and protective safety casing 110. Safety casing 110 is a steel outer shell which shields the operator from contacting hot components and vapors during operation of the solvent recycling system 100. A double layer of insulating material 39 is provided within safety casing 110 providing thermal isolation of safety casing 110 from hot components within solvent recycling system 100.

Safety lid 11, which is closed during system operation, prevents trace solvent vapor fumes from escaping into the atmosphere and provides further protection for an operator from the high temperatures within solvent recycling system 100 during system operation.

A clean solvent compartment 42 for housing a collection vessel 46 for receiving and holding purified solvent is disposed within solvent recycling system 100. Collection vessel 46 may consist of any chemically inert vessel suitable for storing purified solvent for re-use. Collection vessel 46 preferably consists of an inner primary collection vessel 48, and an outer secondary collection vessel 47. The primary collection vessel 48 normally will have a larger capacity than secondary collection vessel 47. Primary collection vessel 48 is positioned inside secondary collection vessel 47.

Primary collection vessel 48 provides a convenient means for an operator to remove the clean liquid solvent end product of the solvent recovery process. Should primary collection vessel 48 overflow with clean liquid solvent, secondary collection vessel 47 serves to collect the overflow and protect the inside of clean solvent compartment 42 from spills.

A clean solvent door 41 is provided for clean solvent compartment 42 allowing easy access to collection vessel 46 and removal of clean liquid solvent.

Figure 5:
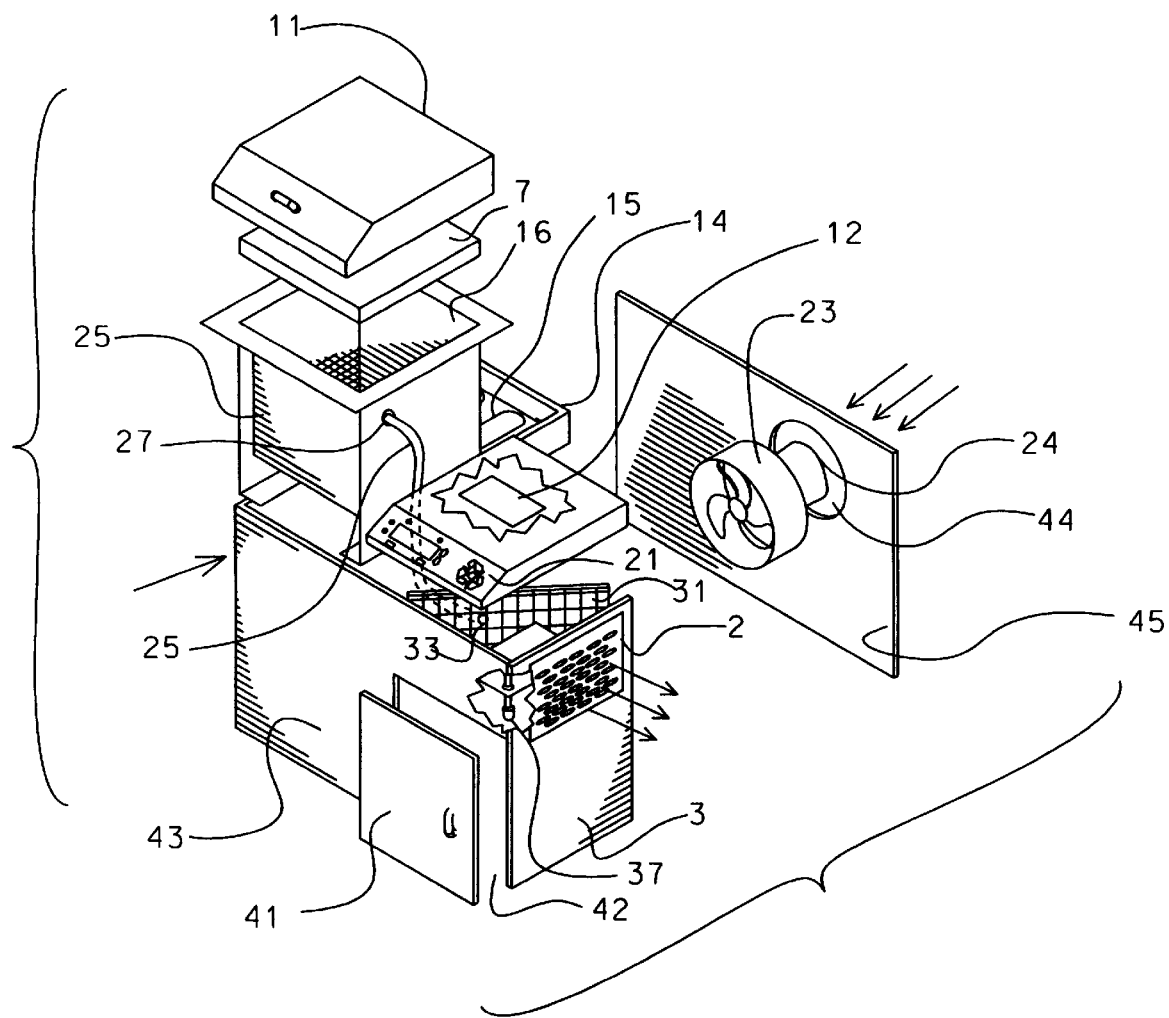
FIG. 5 is an exploded view of the solvent recycling system of FIG. 1.

Condenser access panel 3 allows convenient access to the condenser unit 31 (shown in FIG. 5). Air vents 2 are incorporated into condenser access panel 3 to provide for the flow of cooling air through solvent recycling system 100.

A display panel 21 is located on the outer front area of top panel lid 13. Display panel 21 generally displays system parameters and other essential information related to the solvent recycling process. For the purposes of this invention the term 'system parameters' is intended to include those process measurements, such as pre-selected temperature set point and actual temperature, which characterize the distillation recovery process.

Figure 2:
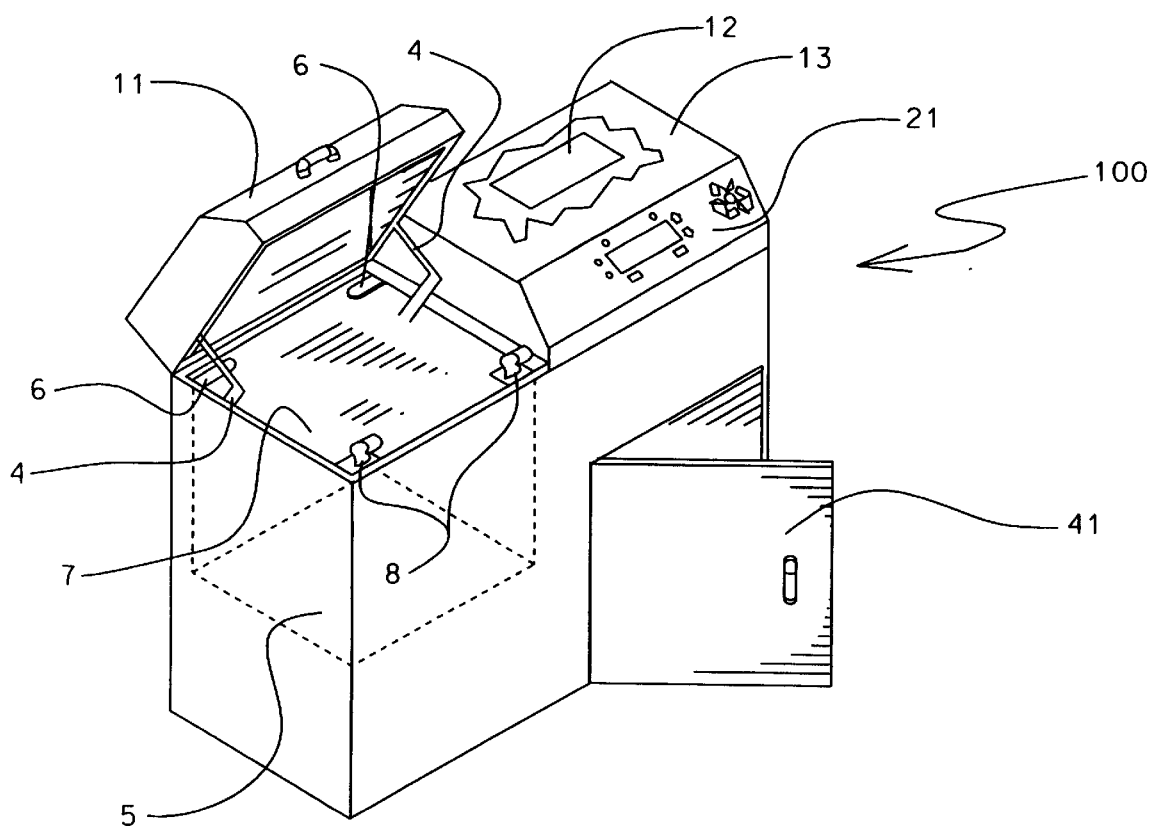
FIG. 2 is a further perspective view of the solvent recycling system.

FIG. 2 is a view of solvent recycling system 100 with safety lid 11 in an open position and inner lid 7 in a closed position. While solvent recycling system 100 is operating, both safety lid 11 and inner lid 7 are closed. This double lid arrangement provides added protection for an operator from heat and fumes generated within reservoir body 5 during the recycling process by retaining any escaping fumes in the region between the outer safety lid and the inner lid preventing their release into the atmosphere.

Safety lid 11 is provided with lid supports 4 for supporting safety lid 11 when safety lid 11 is in an open position.

Inner lid 7 is shown locked into place over reservoir body 5 by two lid lock assemblies 8 and two lid hinge assemblies 6. Lid lock assemblies 8 and lid hinge assemblies 6 can be independently adjusted if required to compensate for wear, settling, heat deformation and the like.

An electronic control module 12 is located beneath top panel lid 13 and behind display panel 21. Electronic control module 12 receives information from display panel 21 and other components (described hereinafter) in solvent recycling system 100, controls the operation of solvent recycling system 100 based on that information, and displays information to the operator on display panel 21.

FIG. 3 shows the construction of inner lid 7. An outer cover plate 50 is superimposed over a heat resistant rubber seal gasket 52 for engaging with the upper edge 55 of reservoir body 5. Seal gasket 52 runs along the outer peripheral edge of inner lid 7. One of two lid lock assemblies 8 is shown. Each lid lock assembly 8 includes a disc type spring 54. Likewise, one of two lid hinge assemblies 6 is shown. Each lid hinge assembly 6 includes a disc type spring 56. The force exerted by springs 54 and 56 maintain pressure on outer cover plate 50 and seal gasket 52 to insure that vapors do not escape from reservoir body 5 when inner lid 7 is closed.

As the thickness of seal gasket 52 decreases due to wear, deformation by heat, settling down and the like, springs 54 and 56 extend, automatically compensating for the reduction in the height of seal gasket 52.

Lid lock adjuster nut 58 and lid hinge adjuster bolt 60 enable further adjustment of each lid lock assembly 8 and lid hinge assembly 6 as required.

Should the pressure inside reservoir body 5 exceed the pressure exerted on seal gasket 52 by springs 54 and 56, inner lid 7 will lift, relieving pressure from within reservoir body 5. In the preferred embodiment pressure relief occurs at about 2.5 psi. Thus lid lock assemblies 8, lid hinge assemblies 6, and outer cover plate 50 function as a pressure relief mechanism thereby further improving the safety of solvent recycling system 100. Thus, inner lid 7 preferably includes a safety release for automatically relieving pressure in the reservoir body which is greater than a predetermined pressure threshold.

FIG. 3a shows a detail section view of inner lid 7. Seal gasket 52 is provided with a flexible cover 62 of Teflon® or other fluorinated polymeric material. A polymeric adherent backing is disposed upon the inner surface of flexible cover 62 to provide resiliency. The interior of outer cover plate 50 is provided with heat insulating material 51.

FIG. 4 illustrates display panel 21 in greater detail. In the preferred embodiment light emitting diode (L.E.D.), and liquid crystal diode (L.C.D) displays are utilized for displaying the output of electronic control module 12. However, it is understood that other display means apparent to persons skilled in the art are intended to be within the scope of the invention.

Likewise, the preferred embodiment utilizes standard push button switches. However, any switch technology, such as capacitive, resistive, flat panel, or other is encompassed by the present invention.

The display panel 21 of the preferred embodiment of the present invention includes the following discrete controls and indicators: power indicator 120, heat indicator 122, set point indicator 124, temperature indicator 126, and switches 128, 130, 132, 134, and 136. In addition display panel 21 includes an alphanumeric display 118 for displaying alphanumeric information.

When illuminated, power indicator 120 indicates the presence of supply power to the electronic control module 12. Heat indicator 122 is illuminated when the signal to activate the heater element 15 (shown in FIG. 5) is present. Set point indicator 124 is illuminated when alphanumeric display 118 is displaying set point temperature. Set point indicator 124 is off when alphanumeric display 118 is displaying actual temperature. Temperature indicator 126 is illuminated when alphanumeric display 118 is displaying actual temperature, and off when alphanumeric display 118 is displaying the pre-selected set point temperature.

Start-stop switch 128 acts as a toggle switch. If solvent recycling system 100 is stopped, it will be started when start-stop switch 128 is depressed. If solvent recycling system 100 is in the process of recycling, it will be stopped when start-stop switch 128 is depressed.

Set-up switch 130 causes solvent recycling system 100 to enter the set-up mode. When set-up switch 130 is depressed alphanumeric display 118 displays the message 'SET-UP'. At this point increment switch 132 and decrement switch 134 are enabled. Depressing either increment switch 132 or decrement switch 134 will cause the alphanumeric display 118 to display the pre-selected temperature set point temperature. Also, set point indicator 124 will illuminate. Further depressions of increment switch 132 will cause the pre-selected temperature set point to increment by 1° Celsius. Further depressions of decrement switch 134 will cause the pre-selected temperature set point to decrement by 1° Celsius. When the desired pre-selected temperature set point is displayed, depressing 'OK' switch 136 will cause the displayed set point to be used during the next recycling process.

Alphanumeric display 118 provides the sensed temperature in either degrees Celsius or degrees Fahrenheit. Alphanumeric display 118 also displays recycler status information and error codes associated with system malfunctions.

Recycler status information is understood to mean information relating to the current operating state of solvent recycling system 100. For example, in the preferred embodiment of the present invention alphanumeric display 118 displays the message "ON" when the system is started, "OFF" when the system is stopped, and "SD-BY" when the solvent recovery cycle has been completed.

In addition, alphanumeric display 118 displays error code information associated with system malfunctions, whereby an operator is directed to check the system components most likely to be the cause of the malfunction.

Table 1 shows the error codes provided by the preferred embodiment of the present invention.

TABLE 1

ERROR CODES

| CODE | PROBLEM | CAUSE | CHECK |
| --- | --- | --- | --- |
| 1 | Heater element | The microprocessor is supplying the signal to turn the heater on, but does not sense an increase in temperature. | Heater power Fuses Heater element |
| 2 | Erroneous temperature readings. | Thermocouple | Thermocouple |
| 3 | Power | Damage to power control circuitry | Power Control Board |

It is understood that other arrangements of displays and indicators are possible and would remain within the scope of the present invention.

Figure 6:
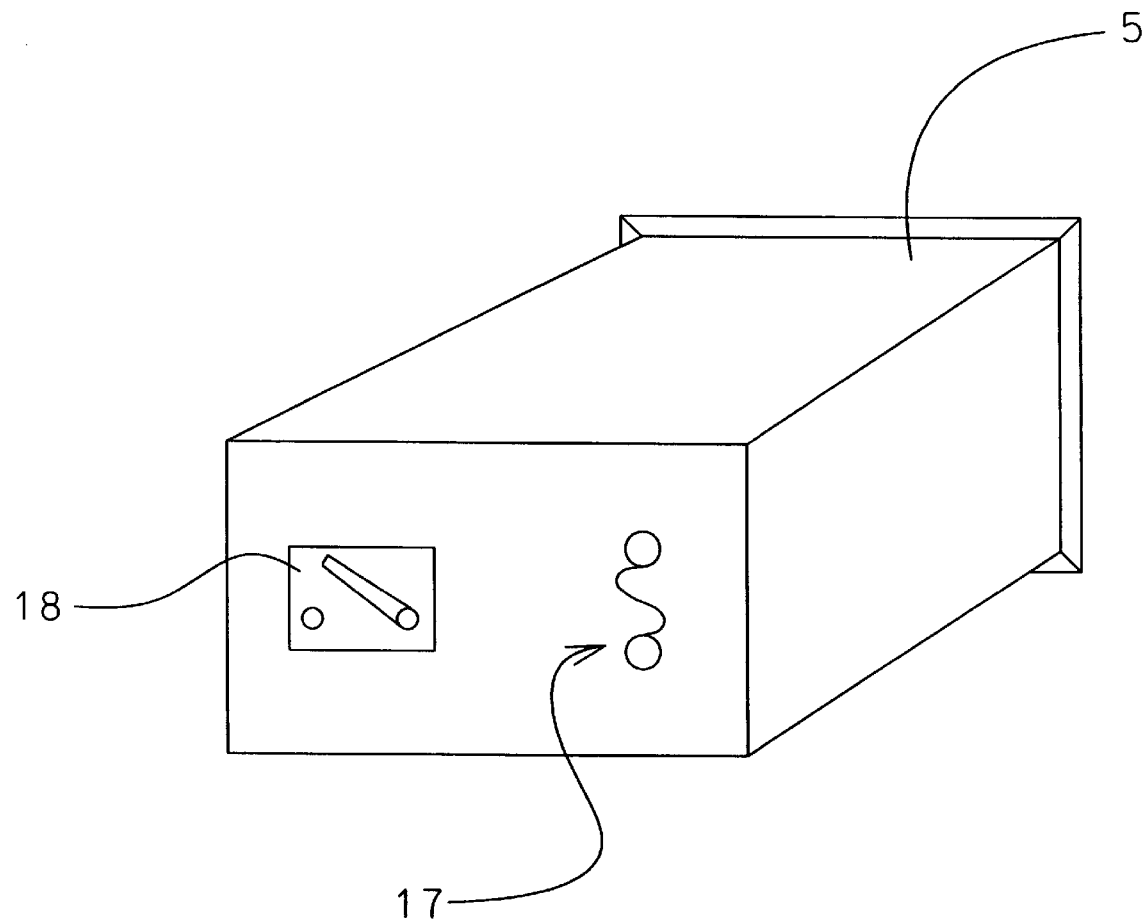
FIG. 6 is a detailed view of the bottom of the liquid solvent reservoir body.

Turning to FIG. 5 there is also shown a view of solvent recycling system 100. The interior surface 16 of reservoir body 5 is coated with Teflon® or an equivalent material to prevent contaminants from sticking to reservoir body 5 and to allow easy cleaning of reservoir body 5. Below reservoir body 5 is an insulated heater module 14 in which heater element 15 is located. A thermocouple 17, is located on the outside bottom of reservoir body 5 and is shown in FIG. 6. Thermocouple 17 senses the temperature inside reservoir body 5 and provides sensed temperature information to electronic control module 12.

To provide further protection from high temperature conditions, a temperature limit switch 18, shown in FIG. 6, is located adjacent to thermocouple 17. If the temperature in reservoir body 5 exceeds about 200° C., temperature limit switch 18 is activated, disconnecting power to heater module 14.

In the preferred embodiment full power is applied to heater element 15 when power is initially supplied to solvent recycling system 100. As a result the temperature in reservoir body 5 rises rapidly until the boiling point of the solvent being processed is reached. When the boiling point of the solvent is reached, most of the heat energy translates into vapor generation and the rate of temperature rise in reservoir body 5 decreases significantly.

As solvent recycling system 100 continues to operate, waste oil and contaminants are collected at the bottom of reservoir body 5 as solvent vapor collects at the top of reservoir body 5. When there is no more solvent evaporation, the temperature begins to increase rapidly again until either a pre-selected temperature set point is reached, or until the rapid rate of temperature increase is sensed by thermocouple 17, whichever occurs first.

The pre-selected temperature set point is determined by the operator and is based on the boiling temperature of the solvent being processed. To prevent contaminants from sticking at the bottom of reservoir body 5 the set point must be adjusted to a value slightly higher than the boiling point of the contaminated solvent in use. The operator determines the desired pre-selected set point and provides the set point information to electronic control module 12 via display panel 21.

Electronic control module 12 compares the temperature provided by thermocouple 17 to the pre-selected set point using microprocessing techniques well known in the art. When the pre-selected set point is reached, electronic control module 12 removes power from heater element 15 and activates fan motor 24. Fan 23 circulates air for cooling solvent recycling system 100. In the system of the preferred embodiment fan motor 24 remains activated for about 30 minutes after the set-point is reached.

If the set point chosen for a given contaminated solvent is set too high, i.e., higher than the temperature achieved at the end of the boiling cycle, heater element 15 will continue to heat reservoir body 5. As a result, the temperature in reservoir body 5 will increase rapidly. This rapid increase in temperature occurs because there is no liquid in reservoir body 5 to be converted into vapor.

In this case electronic control module 12 will sense the rapidly increasing temperature information provided by thermocouple 17. When electronic control module 12 senses a rate of rise of temperature exceeding a pre-determined rate, electronic control module 12 will disconnect power to heater element 15 and energize fan motor 24. It has been found that the pre-determined rate will be in the range of about 2° C. per minute to about 10° C. per minute, depending on the solvent in use and its contaminants.

Thus, solvent recycling system 100 is further protected from damage or fire due to over-temperature conditions and contaminants are prevented from burning and sticking to the bottom of reservoir body 5.

A reservoir outlet 25 is located near the top of reservoir body 5. Solvent vapor generated by the boiling process is conducted through reservoir outlet 25. Reservoir outlet 25 communicates with a reservoir outlet tube 27. Reservoir outlet tube 27 is connected to a condenser unit 31 having a condenser unit inlet 33. Thus solvent vapors are passed into condenser unit 31 where the vapors are cooled by air from fan 23. Air from fan 23 is circulated from air intake 44 through condenser unit 31, and exhausted through air vents 2.

The embodiment illustrates a motorized fan means for circulating air through the solvent recycling system to cool the solvent vapor. However, it will be apparent to those skilled in the art that alternative means for cooling can be utilized, such as compressed air, refrigeration coils and the like.

As the vapor cools it condenses. Condensate is collected in condenser bottom plate 35 of condenser unit 31. Condenser bottom plate 35 is provided with a condenser outlet tube 37 through which the clean condensate passes and is discharged into collection vessel 46 (not shown). The collection vessel is accessed by opening clean solvent door 41.

Front cabinet panel 43 and rear cabinet panel 45 enclose contaminated solvent reservoir body 5, condenser unit 31, heater module 14, fan 23, and clean solvent compartment 42.

Top panel lid 13 contains electronic control module 12. Top panel lid 13 is superimposed over condenser unit 31 so as to provide an outer insulative and protective cover for condenser unit 31 and a protective covering for electronic control module 12.

Figure 7:
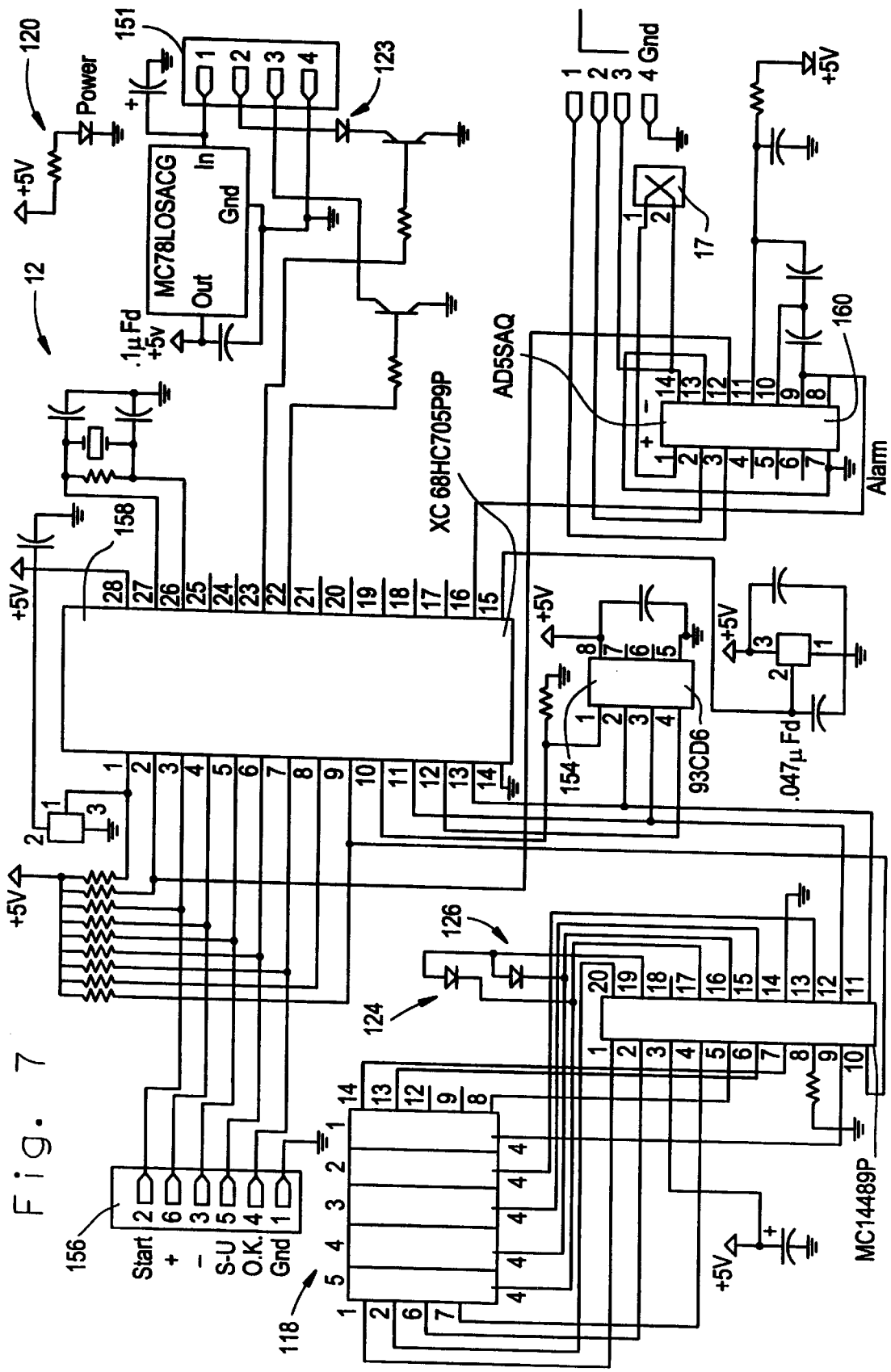
FIG. 7 is a schematic diagram of the electronic control module used in the solvent recycling system.

FIG. 7 is a schematic diagram of electronic control module 12. Display panel 21 communicates with pins 3 through 7 of microprocessor 158 through connector 156. Thermocouple 17 provides sensed temperature information to pin 16 of microprocessor 158 through amplifier-scaler 160. Microprocessor 158 is a standard Motorola 6805 microprocessor programmed using conventional programming methods and techniques which are well known in the art. The instructions are stored in Programmable Read Only Memory (PROM) 154.

When the start-stop switch 128 is depressed microprocessor 158 provides a signal that causes power to be applied to heater element 15. As the system operates, microprocessor 158 compares the pre-selected set point temperature set by the operator, with the sensed temperature information provided by thermocouple 17. When the sensed temperature reaches the set point temperature, microprocessor 158 removes the signal to heater element 15 causing power to be removed from heater element 15. At the same time microprocessor 150 provides a signal to energize fan motor 24.

Microprocessor 158 also monitors the sensed temperature information from thermocouple 17 to detect a rapid increase in temperature indicating completion of the boiling phase of the recycling process. If the rate of rise of sensed temperature exceeds a predetermined limit, microprocessor 158 removes the signal to heater element 15 causing power to be removed from heater element 15. Also, microprocessor 158 provides the signal to energize fan motor 24. In one embodiment of the invention fan motor 24 remains energized for about 30 minutes after an over-temperature condition is sensed.

When the +5 Volt supply is present on electronic control module 12, power indicator 120 is illuminated. Heat indicator 122 is illuminated when the signal to activate heater element 15 is present on pin 23 of microprocessor 158. Set point indicator 124 is illuminated when alphanumeric display 118 is displaying set point temperature. Set point indicator 124 is off when alphanumeric display 118 is displaying actual temperature. Temperature indicator 126 is illuminated when alphanumeric display 118 is displaying actual temperature, and off when alphanumeric display 118 is displaying set point temperature.

Figure 8:
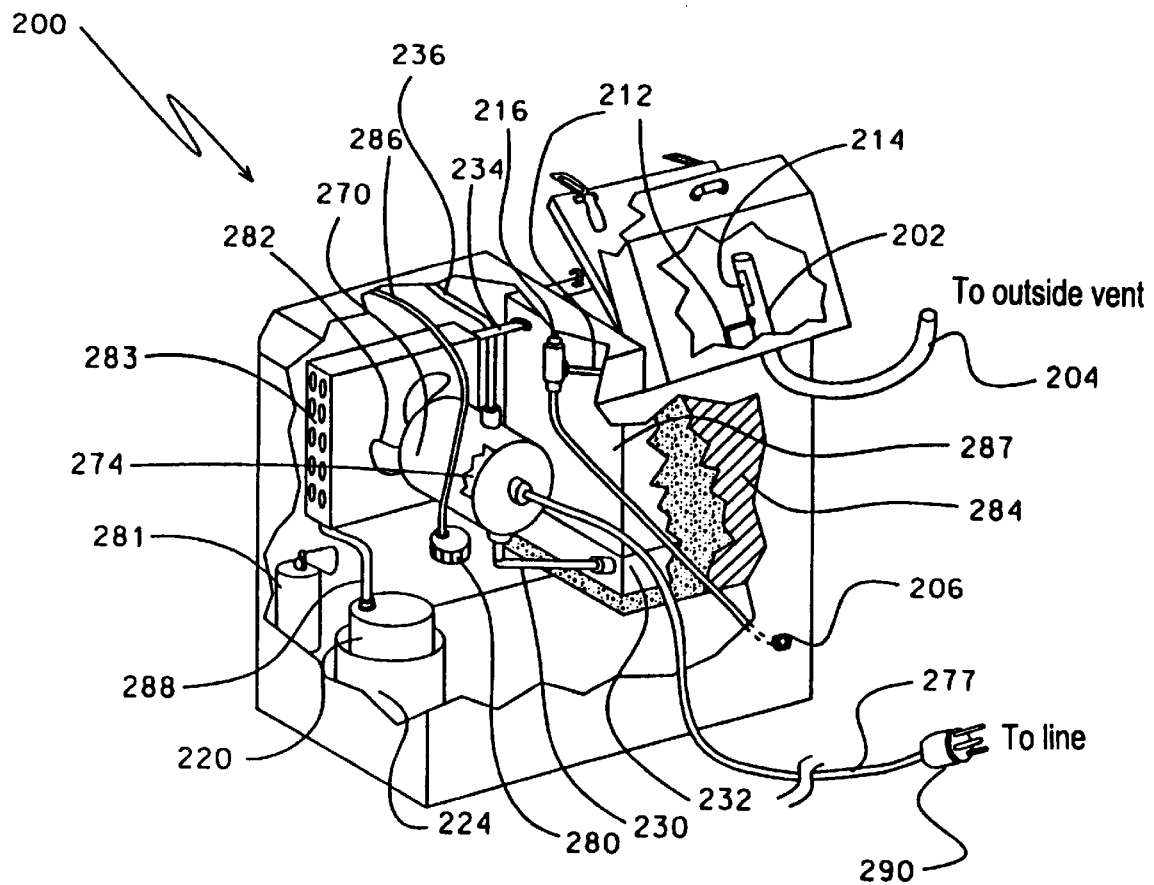
FIG. 8 is a cut away view from the back of the solvent recycling system.

FIG. 8 depicts another embodiment of the present invention. A cut-away view from the back of solvent recycling system 200 is shown. Inner lid 201 and safety lid 203 are shown in the open position. A fume extractor means is provided comprising venturi vacuum generator 202 disposed within safety lid 203, fume exhaust conduit 204 vented to an outer wall, compressed air inlet 206, compressed air inlet conduit 208, fume extractor valve 210, air outlet hose 212, and fume extraction inlet 214.

When safety lid 203 is opened, actuator 216 on fume extractor valve 210 is automatically released to its normally open position. This allows compressed air entering compressed air inlet 206 to flow through compressed air inlet conduit 208, fume extractor valve 210, and through air outlet hose 212 to the input of venturi vacuum generator 202. Compressed air at the input of venturi vacuum generator 202 activates venturi vacuum generator 202 and causes fumes in the vicinity of safety lid 203 to be drawn into fume extraction inlet 214 and finally exhausted through fume exhaust conduit 204.

Solvent reservoir 287 holds contaminated liquid solvent as it boils, vaporizing the solvent. Reservoir outlet tube 234 conducts solvent vapor to condenser unit 283 where the vapor is cooled. The clean solvent condensate resulting from the cooling process is drained through condenser outlet tube 288 and collected in collection vessel 222. Collection vessel 222 includes primary collection vessel 220 for collecting the condensate, and secondary collection vessel 224 for receiving any overflow of clean solvent from primary collection vessel 222.

Also shown is a double layer of insulating material 284 surrounding solvent reservoir 287 and heater module 232. Insulating material 284 can be fiberglass or other suitable material for providing maximum heat efficiency and thermal isolation.

Also shown in FIG. 8 is smoke detector 280. The output of smoke detector 280 is connected to an electronic control module (not shown). When smoke detector 280 senses smoke or extreme heat within solvent recycling system 200, smoke detector 280 sends a signal to the electronic control module (shown previously) thereby causing the system to shut down. In response, the electronic control module removes power from solvent recycling system 200.

Further shown in FIG. 8 is fire extinguisher 281. Fire extinguisher 281 senses the presence of extreme heat or flames within solvent recycling system 200 and dispenses a flame retardant into the interior of solvent recycling system 200 in response.

FIG. 8 also shows fan 282 and an explosion-proof housing 270 containing a non-explosion-proof fan motor (not shown). Power module 274 is also located within explosion-proof housing 270. Power module 274 is provided with line voltage via power plug 290 and power cord 277. Power module 274 communicates with the electronic control module through conductor means 236. Conductor means 236 carries +5 Volt supply power to the electronic control module described previously and receives control signals from the electronic control module. A second conductor means 230 is connected to heater module 232 for providing power to heater module 232 and controlling temperature in response to signals from the electronic control module.

Figure 9:
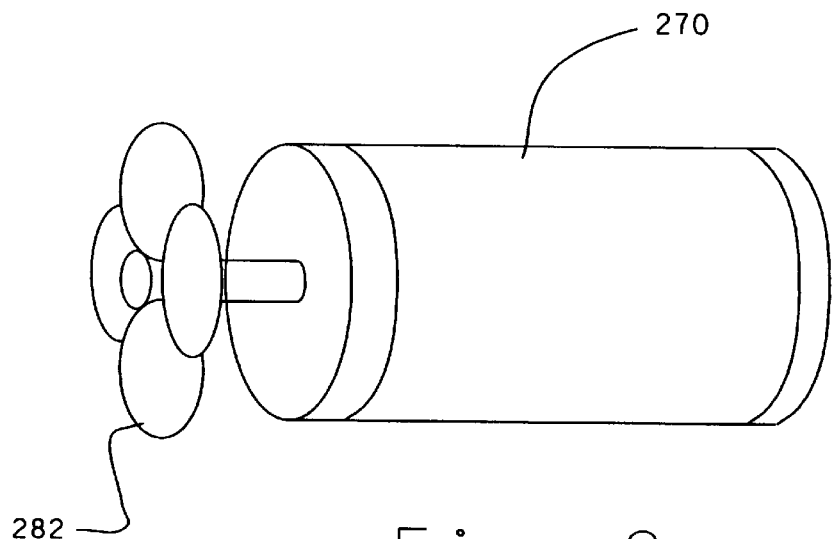
FIG. 9 is a close-up view of the fan and explosion-proof housing.
Figure 9A:
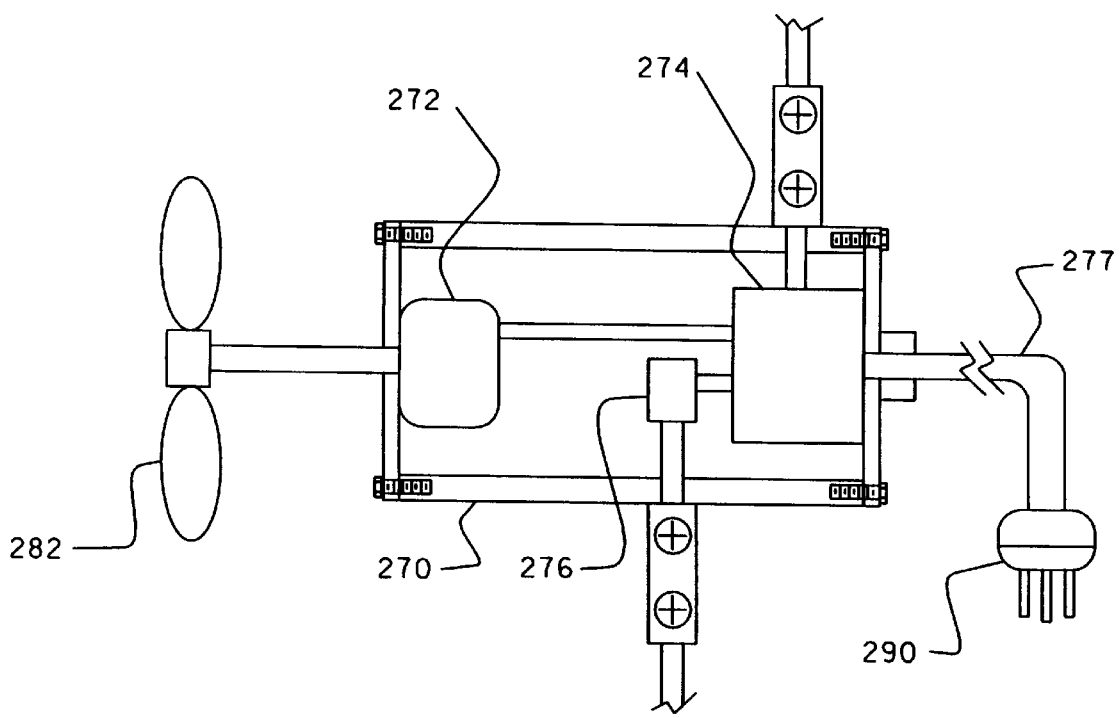
FIG. 9a is detailed view of the inside of the explosion-proof housing.

FIG. 9 shows a close up of fan 282 connected to explosion-proof housing 270. FIG. 9a shows a side cut away view of explosion-proof housing 270. A standard non-explosion-proof fan motor 272 is placed within explosion-proof housing 270. Power module 274 provides power to heater module 232, the electronic control module, and non-explosion-proof fan motor 272. An intrinsically safe barrier 276 is connected between power module 274 and the electronic control module to prevent the supply voltage at the input of the electronic control module from rising to an unsafe value in the event of a fault voltage being generated within power module 274.

While the invention has been described in conjunction with various embodiments, they are illustrative only. Accordingly, many alternatives, modifications and variations will be apparent to persons skilled in the art in light of the foregoing detailed description, and it is therefore intended to embrace all such alternatives and variations as to fall within the spirit and broad scope of the appended claims.

We claim:

1. A solvent recycling system comprising in integral unitized combination:

evaporator means having contaminated liquid solvent inlet means and solvent vapor outlet means;

means for heating contaminated liquid solvent in said evaporator means;

means for controlling said means for heating solvent;

inner closure means for said evaporator means located at said liquid solvent inlet means, said inner closure means including means for automatically relieving pressure which is higher than a predetermined pressure build up within said evaporator means;

outer insulative and protective safety casing for said solvent recycling system comprising an outer closure means for said evaporator means positioned for access to said inner closure means and said evaporator means, said outer closure means shielding a system operator from solvent discharged when said inner closure means relieves pressure build up within said evaporator means;

means for receiving and condensing solvent vapor from said evaporator means, and means for collecting purified solvent condensate, said means for controlling said means for heating including means for sensing the temperature of solvent in said evaporator means and means for electronically monitoring temperature change and discontinuing the heating when the temperature change meets or exceeds a predetermined value.

2. The solvent recycling system of claim 1 wherein said means for sensing the temperature includes an output, and temperature control means for generating a temperature control signal responsive to said means for sensing the temperature, said temperature control means having an input connected to the output of said means for sensing the temperature, and an output connected to said heating means.

3. The solvent recycling system of claim 1 further comprising means for controlling operation of said solvent recycling system including:

operating voltage input means;

power supply means for supplying operating voltage to said operating voltage input means, said power supply means having means for preventing unsafe voltage and current levels from being present at said operating voltage input means.

4. The solvent recycling system of claim 3 wherein said means for controlling operation of said solvent recycling system further includes:

input means for setting a pre-selected temperature set point, and means for displaying the pre-selected temperature set point.

5. The solvent-recycling system of claim 4 further comprising means for incrementally setting the pre-selected temperature set point to values between about 50° C. and about 200° C.

6. The solvent recycling system of claim 3 wherein said means for controlling operation of said solvent recycling system further includes means for displaying said sensed temperature.

7. The solvent recycling system of claim 3 wherein said means for controlling operation of said solvent recycling system further includes display means for alternately displaying sensed temperature information and pre-selected temperature set point information.

8. The solvent recycling system of claim 3 wherein said means for controlling operation of said solvent recycling system further includes means for displaying system status.

9. The solvent recycling system of claim 1 further comprising:

means for determining system malfunctions, and means for displaying system malfunction information.

10. The solvent recycling system of claim 1 wherein said outer insulative and protective safety casing comprises a secondary safety outer closure means superimposed over said inner closure means.

11. The solvent recycling system of claim 1 further comprising means for extracting fumes from said evaporator means.

12. The solvent recycling system of claim 1 further comprising:

smoke detector means disposed within said outer insulative and protective safety casing;

power supply means in communication with said smoke detector means;

said smoke detector means comprising means for disconnecting said solvent recycling system from said power supply means responsive to said smoke detector means.

13. The solvent recycling system of claim 12 comprising an explosion-proof housing for said power supply means.

14. The solvent recycling system of claim 1 wherein said means for receiving and condensing solvent vapor comprises compressed air means.

15. The solvent recycling system of claim 1 wherein said means for receiving and condensing solvent vapor comprises an outer jacket for a circulating coolant.

16. The solvent recycling system of claim 1 therein said means for receiving and condensing solvent vapor comprises a fan having motor means.

17. The solvent recycling system of claim 16 wherein said fan comprises a non-explosion-proof motor means.

18. The solvent recycling system of claim 17 wherein said non-explosion-proof motor means is disposed in an explosion-proof housing.

19. The solvent recycling system of claim 1 wherein said means for receiving and condensing solvent vapor comprises a refrigeration coil.

20. The solvent recycling system of claim 1 wherein said means for collecting purified solvent condensate is disposed within a compartment of said integral unitized structure.

21. The solvent recycling system of claim 1 further comprising fire extinguisher means disposed within said outer insulative and protective safety casing for actuation in response to over temperature conditions.

22. The solvent recycling system of claim 1 wherein said inner closure means comprises a peripheral gasket for engaging with said liquid solvent inlet means, said gasket comprising a fluorinated polymeric material.

23. The solvent recycling system of claim 1 wherein said means for collecting purified solvent condensate from said means for receiving and condensing solvent vapor comprises a collection vessel having an inner primary container and a coaxially aligned outer secondary overflow container.

24. The solvent recycling system of claim 1 wherein said automatic pressure relieving means includes an inner lid equipped with adjustable spring-loaded lid hinge and lid lock assemblies to relieve the pressure from within said evaporator means when the pressure exceeds an amount set by adjusting said adjustable spring-loaded assemblies.

25. A solvent recycling system comprising:

evaporator means having liquid solvent inlet means and solvent vapor outlet means;

means for heating liquid solvent in said evaporator means;

means for controlling said means for heating solvent;

inner closure means for said evaporator means located at said liquid solvent inlet means, said inner closure means including means for automatically relieving pressure within said evaporator means;

outer insulative and protective safety casing for said solvent recycling system, said outer casing comprising an outer closure means superimposed over said inner closure means for access to said evaporator means and for shielding a system operator from solvent discharged when said inner closure means relieves pressure build up within said evaporator means;

means for removing noxious fumes from the region between said inner and outer closure means;

means for receiving and condensing solvent vapor from said evaporator means;

wherein the means for controlling said means for heating comprises means for sensing the temperature of said evaporator and means for electronically monitoring the temperature change and discontinuing the heating when the temperature change meets or exceeds a pre-determined value, and means for collecting purified solvent condensate.

26. The solvent recycling system of claim 25 wherein said means for sensing the temperature in said evaporator means generates a temperature control signal when the temperature in said evaporator means exceeds a pre-selected temperature set point.

27. The solvent recycling system of claim 25 comprising fire extinguisher means disposed within said outer insulative and protective casing for dispensing a fire retardant in response to over-temperature conditions within said system.

28. The solvent recycling system of claim 25 wherein said means for removing noxious fumes comprises exhaust means.

29. The solvent recycling system of claim 28 wherein said exhaust means is activated automatically when said outer closure means is opened.

30. The solvent recycling system of claim 25 further comprising:

smoke detector means;

power supply means connected to said smoke detector means, and power supply disconnection means for said smoke detector means.

31. The solvent recycling system of claim 30 comprising an explosion-proof housing for said power supply means.

32. The solvent recycling system of claim 25 wherein said automatic pressure relieving means includes an inner lid equipped with adjustable spring-loaded lid hinge and lid lock assemblies to relieve the pressure from within said evaporator means when the pressure exceeds an amount set by adjusting said adjustable spring-loaded assemblies.

* * * * *